United States Patent Office 3,557,093
Patented Jan. 19, 1971

3,557,093
1-FORMYL-3-NITRO-AZACYCLOALKAN-2-ONES
AND PROCESS FOR THEIR PRODUCTION
Verena R. Foitl, Dobbs Ferry, N.Y., and Walter Traber,
Riehen, Switzerland, assignors to Geigy Chemical Corporation, Ardsley, N.Y., a corporation of New York
No Drawing. Filed Jan. 22, 1969, Ser. No. 793,164
Claims priority, application Switzerland, Jan. 22, 1968,
938/68
Int. Cl. C07d 41/06
U.S. Cl. 260—239.3         12 Claims

ABSTRACT OF THE DISCLOSURE 1-formyl-3-nitro-azacycloalkan-2-ones of the formula

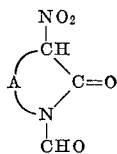

wherein

A represents an alkylene radical having 4 to 10 carbon atoms in the chain, which is unsubstituted or substituted by lower alkyl, are disclosed as important intermediates for the production of amino acids such as lysine and agricultural chemicals, e.g. certain fungicides; a process for producing these intermediates in good yields from corresponding azacycloalkanones is also described.

DESCRIPTION OF THE INVENTION

The present invention relates to new 1-formyl-3-nitro-azacycloalkan-2-ones and a process for their production.

The use of a formylating reagent consisting of an N-disubstituted formamide and an acid halogenating agent is described in the literature for the preparation of aldehyde derivatives of activated aromatic compounds (Vilsmeier-Haak reaction). In U.S. Pat. No. 3,031,443 the preparation of 3-nitro-azacycloalkan-2-one-1-carbochlorides from azacycloalkan-2-ones in a two-step process is described.

The invention provides 1-formyl-3-nitro-azacycloalkan-2-ones of the formula

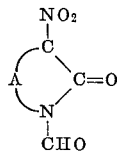

(I)

wherein

A represents an alkylene radical having 4 to 10 carbon atoms in the chain, which is unsubstituted or, solely, substituted by lower alkyl, which are produced in surprisingly good yields by reacting azacycloalkanones of the formula

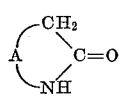

(II)

wherein A has the meaning given under Formula I, with a formylating reagent consisting of an N-disubstituted formamide and an acid halogenating agent and nitrating the complex thus obtained at temperatures of from −10 to +30° C. and then hydrolyzing it at temperatures below +30° C.

For the process according to the invention, the starting materials azacycloalkan-2-one, N-disubstituted formamide and acid halogenating agent are preferably employed in a molar ratio of 1:1:2. As an alternative, however, one may employ a multiple of the molar amount of N-disubstituted formamide, whereby an excess serves as solvent and/or diluent. The presence of an organic aprotic solvent or diluent is required in the process step of complex formation. Besides the N-disubstituted formamide, accordingly, also aliphatic halohydrocarbons such as dichloromethane, chloroform, chlorinated ethanes, aromatic hydrocarbons and halohydrocarbons, as well as ethers and ether-like compounds may be used as aprotic solvent or diluent for the process.

Suitable azacycloalkanones of the Formula II for the process according to the invention are e.g., azacycloheptan-2-one, azacyclooctan-2-one, azacyclononan-2-one azacyclodecan - 2 - one, azacycloundecan-2-one, azacyclododecan-2-one and azacyclotridecan-2-one. These cycloalkanones can be mono- or poly-substituted by lower alkyl with 1 to 6 carbon atoms, e.g., by methyl, ethyl, n-propyl, isopropyl, n-butyl, sec.-butyl, tert.-butyl, also by pentyl and hexyl radicals.

Suitable for producing the formylating reagent are N-disubstituted formamides of the Formula III:

(III)

wherein $R_1$ represents an alkyl radical of 1 to 5 carbon atoms,
$R_2$ represents an alkyl radical of 1 to 5 carbon atoms, a phenyl, benzyl or cycloalkyl radical, or
$R_1$ and $R_2$ together with the vicinal nitrogen atom represent a heterocyclic ring which may contain additional hetero atoms.

The preferred compounds of Formula III are N,N-dimethyl formamide, N,N-diethyl formamide, N-methyl formanilide, N-formylmorpholine or N-formyl piperidine; the most preferred compound is N,N-dimethyl formamide.

Suitable acid halogenating agents are phosphorus oxychloride, phosphorus trichloride, phosphorus pentachloride, phosphorus tribromide, phosphorus oxybromide, thionyl chloride, sulfuryl chloride, phosgene, oxalyl chloride or benzoyl bromide.

In the process according to the invention, preferably a "mixed acid," i.e. a mixture of concentrated nitric acid and concentrated sulfuric acid, is used for nitration. In order to achieve a nitration which is as quantitative as possible, it is advisable to employ the mixed acid in excess, preferably an amount of from two to five times the molar amount of $HNO_3$, calculated on the azacycloalkanone. When using a mixed acid which consists of concentrated nitric acid, concentrated sulfuric acid and sulfur trioxide, the molar ratio of nitric acid to azacycloalkanone can be 1:1.

In the performance of the process according to the invention, it is practical to start with the N-disubstituted formamide and to add the halogenating agent at temperatures between 0° and 40° C., preferably between 0° and 10° C., while thoroughly stirring. If the N-disubstituted formamide is employed in molar amounts, the presence of an organic aprotic solvent or diluent is required. Following this, the azacycloalkanone is added. The two last-named reactants, halogenating agent and azacycloalkanone, may be introduced into the reaction as solution in any of the above-mentioned aprotic solvents such as benzene, chloroform, etc. For acceleration of the reaction, which otherwise occurs smoothly at temperatures between 0° and 40° C., the reaction mixture can be heated to at most 120° C., preferably to 60–85° C. At the end of the reaction it is advisable to remove the solvent under vacuum at temperatures between 0° and 40° C. and to add the complex obtained directly to the mixed acid. In this step as well, it is essential that the temperature be kept below 30° C., preferably at about 10° C. The reaction mixture is then hydrolyzed by treating it with ice water, whereby care must be taken to keep the temperature below 30° C., preferably below 15° C. The 1-formyl-3-nitro-azacycloalkan-2-one is usually obtained in the form of colorless crystals and is then separated.

The novel 1-formyl-3-nitro-azacycloalkan-2-ones are obtained, according to the invention, in excellent yields. The new compounds represent useful intermediates for the preparation of amino acids, especially lysine, and of agro-chemicals, e.g., fungicides as described in the French Pat. No. 1,441,071. Thus, for example, 3 - nitro - aza-cycloheptan-2-one can be prepared by saponification of the corresponding formyl derivative. For this purpose it is heated in water to temperatures of from 50 to 100° C., preferably to boiling temperature. Upon cooling of the solution, the 3-nitro-azacyclo-heptan-2-one crystallizes in excellent yield. It can be converted, without any further purifying operation, in known manner by hydrogenation into 3-amino-azacycloheptan-2-one, a compound that is important in the preparation of lysine.

The following examples illustrate the invention. The temperatures are indicated in centigrades, and the melting points are uncorrected.

EXAMPLE 1

(a) To a solution of 15 g. of dimethyl formamide in 150 ml. of chloroform, 33 g. of phosphorus oxychloride are added dropwise at 20° with stirring. To this suspension, 11.3 g. of azacycloheptan-2-one, dissolved in 50 ml. of chloroform, are added dropwise over a period of 2 hours. The reaction mixture is then refluxed for 5 hours, and concentrated under vacuum. The oily residue is introduced at 0–10° with vigorous stirring into a mixed acid made of 200 ml. of concentrated sulfuric acid and 20 ml. of 100% nitric acid. Upon completion of the addition, the resultant mixture is immediately poured into ice water, whereby the nitro compound precipitates. The precipitate is separated, washed neutral with water and recrystallized from ethanol. The 1-formyl-3-nitro-azacycloheptan-2-one thus obtained has a melting point of 120–122°. The yield is 85% of the theoretical.

(b) When 19.7 g. of azacyclotridecan-2-one are used instead of the 11.3 g. of azacycloheptan-2-one in Example 1(a), 1-formyl - 3 - nitro - azacyclotridecan-2-one with a melting point of 112–114° is obtained in an analogous manner, in a yield of 87% of the theoretical.

EXAMPLE 2

To a mixture of 11.3 g. of azacycloheptan-2-one and 27.4 g. of dimethyl formamide, 42.1 g. of phosphorus pentachloride are added in portions at 10–20°. The resulting oil is stirred for 10 hours at room temperature and then added dropwise, at 0 to 5° with stirring, into a mixed acid comprising 20 ml. of 100% nitric acid and 100 ml. of concentrated sulfuric acid. Stirring of the reaction mixture is then continued for half an hour at 0 to 5°, and thereafter the reaction mixture is poured slowly onto ice. The precipitated crystal sludge is separated, washed neutral with water and recrystallized from ethanol. 1-formyl-3-nitro-azacycloheptan-2-one with a melting point of 120–122° is obtained in 88% yield of the theoretical.

EXAMPLE 3

48 g. of thionyl chloride are added dropwise to a mixture of 15.5 g. of dimethyl formamide and 150 ml. of chloroform at 5–10°. At the same temperature, a solution of 25.5 g. of azacyclooctan-2-one in 100 ml. of chloroform is then added dropwise and the resulting reaction mixture is stirred for 20 hours at 15–20°. The solvent is removed at room temperature under vacuum and the resultant oil is added dropwise at 0–5° and with stirring to a mixed acid obtained from 40 ml. of conc. nitric acid and 150 ml. of conc. sulfuric acid. Stirring of the reaction mixture is continued for half an hour whereby the temperature is allowed to rise to 10°, and thereafter the reaction mixture is poured slowly onto ice. The precipitated crystal sludge is separated, washed neutral with water and recrystallized from methanol. The 1-formyl-3-nitro-azacyclooctan-2-one has a melting point of 104–107°.

EXAMPLE 4

70 g. of phosgene are introduced into a solution of 51.2 g. of dimethyl formamide in 300 ml. of chloroform at 0–10°. At the same temperature a solution of 50.6 g. of 5-tert.-butyl-azacycloheptan-2-one in 200 ml. of chloroform is then added dropwise. The resultant mixture is stirred for 10 hours at 20–25° and the solvent subsequently removed under vacuum below 25°. The oily residue is added dropwise at 0–10° to a mixed acid obtained from 60 ml. of conc. nitric acid and 300 ml. of conc. sulfuric acid. The reaction mixture is stirred for half an hour and then poured onto ice. The precipitated product is separated, washed neutral with water and recrystallized from ethanol. The 5-tert.-butyl-1-formyl-3-nitro-azacycloheptan-2-one has a melting point of 141–145°.

EXAMPLE 5

54 g. of phosphorus tribromide are added dropwise at 0–5° to a solution of 34 g. of dimethyl formamide in 200 ml. of chloroform. After stirring for 1 hour at the same temperature a solution of 22.6 g. of azacycloheptan-2-one in 120 ml. of chloroform is added dropwise at 5–10° and the resultant mixture is stirred for 20 hours at room temperature. The oil, obtained after removal of the solvent at room temperature under vacuum, is added dropwise at 0–10° to a nitrating mixture of 10 ml. of conc. nitric acid and 100 ml. of conc. sulfuric acid. The reaction mixture is stirred for half an hour at 10° and then poured onto ice. The precipitate is collected, washed neutral with water and recrystallized from ethanol. The 1-formyl-3-nitro-azacycloheptan-2-one thus obtained has a melting point of 119–122°.

EXAMPLE 6

3-nitro-azacycloheptan-2-one from 1-formyl-3-nitro-azacycloheptan-2-one 5 g. of 1-formyl-3-nitro-azacycloheptan-2-one in 10 ml. of water are heated to boiling for 45 minutes. After cooling to room temperature the product is collected and dried. The 3-nitro-azacycloheptan-2-one melting at 165–168° is thus obtained.

EXAMPLE 7

3-amino-azacycloheptan-2-one from 3-nitro-azacycloheptan-2-one 81.4 g. of 3-nitro-azacycloheptan-2-one are dissolved in 800 ml. of absolute ethanol. After adding 5 g. of palladium charcoal the mixture is agitated under an atmosphere of hydrogen at normal pressure and room temperature until the calculated amount of hydrogen is taken up. The catalyst is separated by filtration, the filtrate evaporated under water jet vacuum and the residue distilled under high vacuum. The 3-amino-azacycloheptan-2-one is thus obtained with a boiling point of 115°/0.02 torr and a melting point of 68–70°.

EXAMPLE 8

3-benzylamino-azacycloheptan-2-one from 3-amino-azacycloheptan-2-one (known from French Pat. No. 1,441,071)

12.8 g. of 3-amino-azacycloheptan-2-one are dissolved in 250 ml. of ethanol, placed in an autoclave together with 10.6 g. of benzaldehyde and 2 g. of Raney nickel and subjected to a hydrogen pressure of 10 atmospheres. The autoclave is heated to 70° and agitated until the hydrogen uptake is terminated. The catalyst is removed by filtration, the filtrate evaporated under water jet vacuum and the residue recrystallized from aqueous ethanol. The 3-benzylamino-azacycloheptan-2-one thus obtained has a melting point of 76–77°.

We claim:
1. A compound of the formula

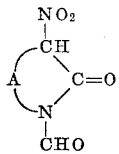

wherein

A represents alkylene having 4 to 10 carbon atoms in the chain, and being unsubstituted or substituted by lower alkyl.

2. 1-formyl-3-nitro-azacycloheptan-2-one.
3. 1-formyl-3-nitro-azacyclotridecan-2-one.
4. 1-formyl-3-nitro-azacyclooctan-2-one.
5. A process for the production of a compound of the formula

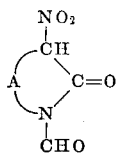 (I)

wherein

A represents alkylene having 4 to 10 carbon atoms in the chain, and being unsubstituted or substituted by lower alkyl, which process comprises reacting a compound of the formula

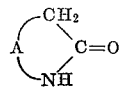 (II)

wherein A has the meaning given above, with a formylating reagent consisting of an N-disubstituted formamide of the formula

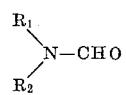 (III)

wherein $R_1$ represents an alkyl radical of 1 to 5 carbon atoms,
$R_2$ represents an alkyl radical of 1 to 5 carbon atoms, a phenyl, benzyl or cycloalkyl radical, or
$R_1$ and $R_2$ together with the vicinal nitrogen atom represent a heterocyclic ring which may contain additional hetero atoms, and an acid halogenating agent, in the presence of an organic aprotic solvent and/or diluent, and nitrating and hydrolysing the complex obtained.

6. A process as described in claim 5, wherein said N-disubstituted formamide is dimethyl formamide.
7. A process as described in claim 5, wherein said acid halogenating agent is selected from phosphorus trichloride, phosphorus tribromide, phosphorus oxychloride, phosphorus pentachloride, phosgene and thionyl chloride.
8. A process as described in claim 5, wherein the reaction mixture is heated to at most 120° C. and the solvent is substantially entirely removed prior to nitration.
9. A process as described in claim 5, wherein the nitration is carried out with a mixed acid consisting of nitric-acid and sulfuric acid.
10. A process as described in claim 9, wherein the complex consisting of azacycloalkanone and formylating reagent is nitrated at temperatures of from —10 to +30° C.
11. A process as described in claim 9, wherein the reaction mixture is hydrolysed at temperatures below +30° C.
12. A process as described in claim 9, wherein an excess of the N-disubstituted formamide is used as organic aprotic solvent and/or diluent.

References Cited

UNITED STATES PATENTS 3,031,443    4/1962    Ottenheym et al. _____ 260—239.3

HENRY R. JILES, Primary Examiner

R. T. BOND, Assistant Examiner

U.S. Cl. X.R.

260—534